(12) United States Patent
Anno et al.

(10) Patent No.: US 7,750,996 B2
(45) Date of Patent: Jul. 6, 2010

(54) LIQUID CRYSTAL DISPLAY DEVICE

(75) Inventors: Kouichi Anno, Mobara (JP); Hiroko Hayata, Mobara (JP); Tohru Sasaki, Mobara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/107,928

(22) Filed: Mar. 26, 2002

(65) Prior Publication Data

US 2002/0171791 A1    Nov. 21, 2002

(30) Foreign Application Priority Data

May 18, 2001    (JP)    .............................. 2001-148812

(51) Int. Cl.
*G02F 1/1335*    (2006.01)
(52) U.S. Cl. ...................... 349/106; 349/114
(58) Field of Classification Search ......... 349/106–109, 349/110, 114
See application file for complete search history.

(56) References Cited

U.S. PATENT DOCUMENTS

| | | | | |
|---|---|---|---|---|
| 5,122,891 A * | 6/1992 | Kim | .......................... | 349/106 |
| 5,367,393 A * | 11/1994 | Ohara et al. | ................. | 349/111 |
| 5,936,694 A | 8/1999 | Suzuki et al. | | |
| 5,942,848 A * | 8/1999 | Van Doorn et al. | .......... | 313/461 |
| 6,084,650 A * | 7/2000 | Sekiguchi | .................... | 349/106 |
| 6,124,909 A | 9/2000 | Miyashita et al. | | |
| 6,215,538 B1 | 4/2001 | Narutaki et al. | | |
| 6,313,890 B1 * | 11/2001 | Tamatani | ..................... | 349/61 |
| 6,476,891 B1 * | 11/2002 | Shibazaki et al. | ........... | 349/117 |
| 6,501,521 B2 * | 12/2002 | Matsushita et al. | .......... | 349/106 |
| 6,624,860 B1 * | 9/2003 | Narutaki et al. | ............. | 349/106 |
| 6,707,519 B1 * | 3/2004 | Okumura et al. | ............ | 349/114 |
| 6,909,479 B2 * | 6/2005 | Iijima | ........................ | 349/109 |
| 7,250,998 B2 * | 7/2007 | Narutaki et al. | ............. | 349/114 |

FOREIGN PATENT DOCUMENTS

| | | |
|---|---|---|
| JP | 10-319386 | 12/1998 |
| JP | 11-183891 | 7/1999 |
| JP | 11/183892 | 9/1999 |
| JP | 11-326625 | * 11/1999 |
| JP | 11326625 | * 11/1999 |
| JP | 2000-111902 | 4/2000 |
| JP | 2000-241808 | 9/2000 |
| JP | 2001-133766 | 5/2001 |
| JP | 2001-133768 | 5/2001 |

* cited by examiner

*Primary Examiner*—Dung T. Nguyen
(74) *Attorney, Agent, or Firm*—Milbank, Tweed, Hadley & McCloy

(57) ABSTRACT

To provide a liquid crystal display device to suitably perform color balance adjustment. For this, the liquid crystal display device includes pixel regions each including a light reflection portion and a light transmission portion on a liquid-crystal-side surface of one substrate out of respective substrates arranged to face each other in an opposed manner while sandwiching liquid crystal therebetween, wherein color filters are formed in pixel regions on a liquid-crystal-side surface of the other substrate out of the respective substrates, and each color filter is provided with an opening or notch at a part of a portion facing the light reflection portion in an opposed manner, material layers having a layer thickness substantially equal to a height of step generated by the color filters in regions facing the opening or notch of each color filter in an opposed manner on the liquid-crystal-side surface of one substrate.

4 Claims, 7 Drawing Sheets

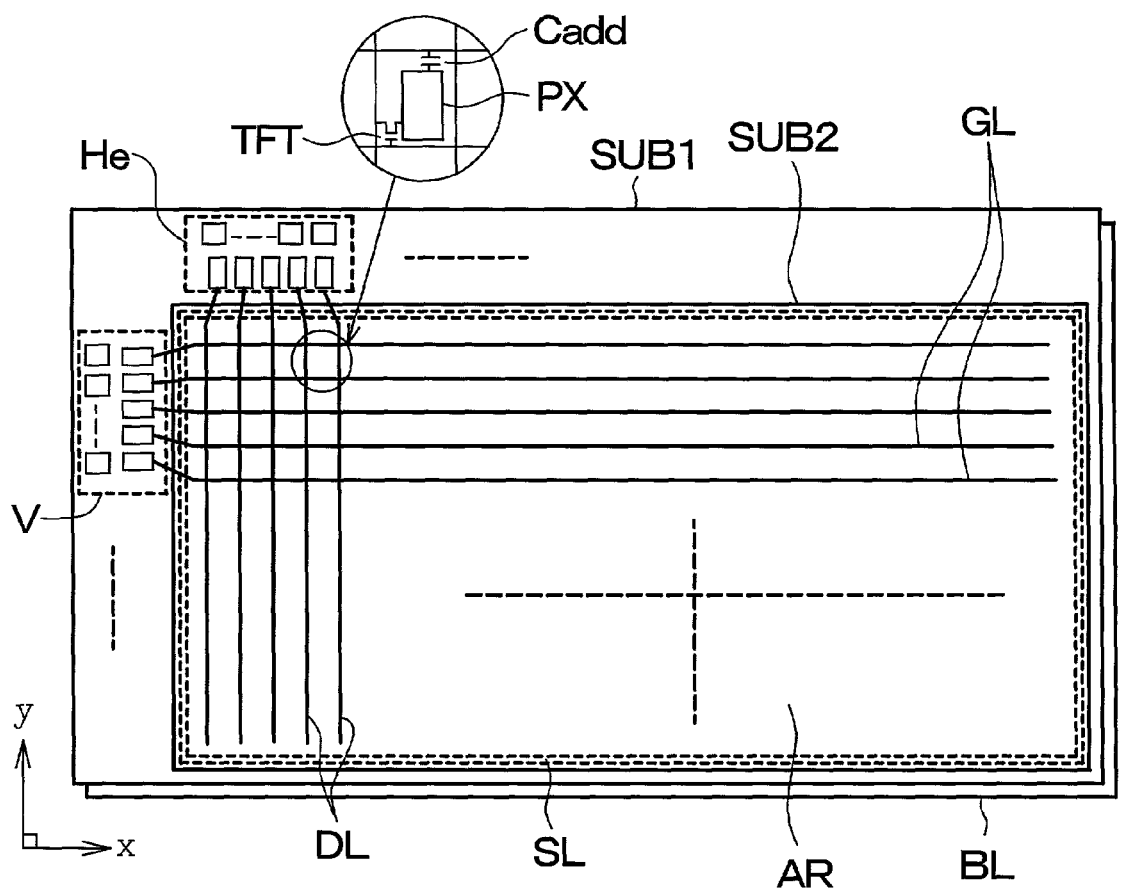
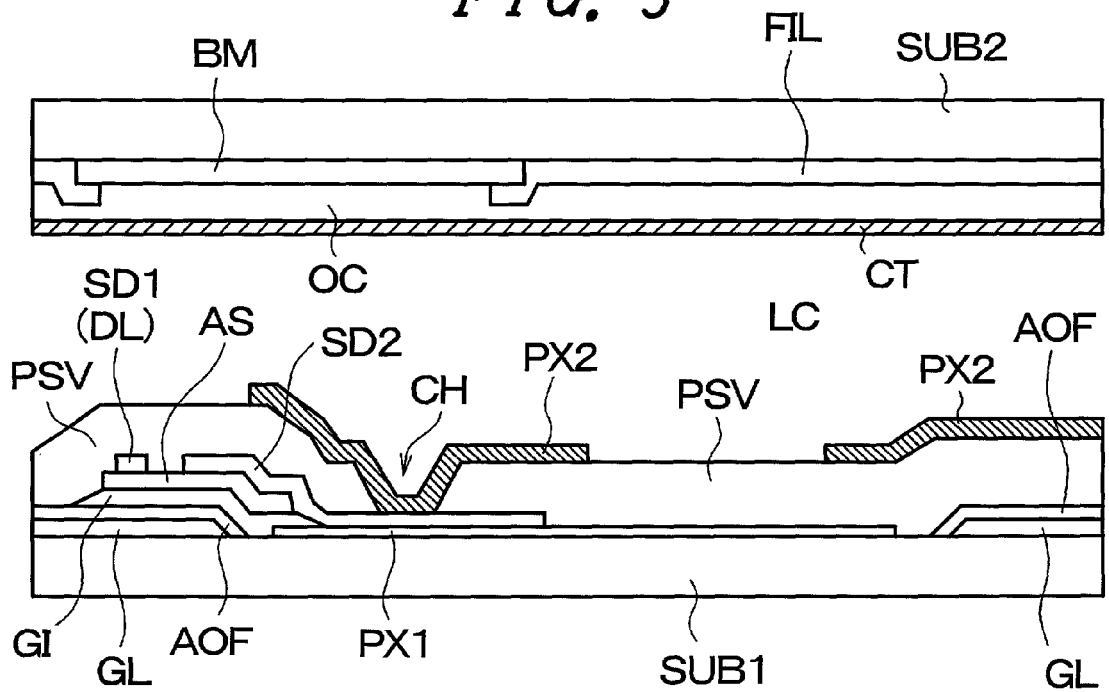

LIQUID CRYSTAL DISPLAY DEVICE

BACKGROUND OF THE INVENTION

The present invention relates to a liquid crystal display device, and more particularly to a so-called "partial transmission type" active matrix liquid crystal display device.

In an active matrix type liquid crystal display device, on a liquid-crystal-side surface of one of respective transparent substrates which are arranged to face each other in an opposed manner while sandwiching liquid crystal therebetween, gate signal lines which are extended in the x direction and are arranged in the y direction in parallel and drain signal lines which are extended in the y direction and are arranged in the x direction in parallel are formed, and regions surrounded by these respective signal lines are formed as pixel regions.

A thin film transistor which is driven by scanning signals from a one-side gate signal line and a pixel electrode to which video signals are supplied from a one-side drain signal line through the thin film transistor are provided to each pixel region.

Further, with respect to such a liquid crystal display device, a so-called partial transmission type liquid crystal display device includes a light transmission portion which constitutes a region which allows light from a backlight disposed at a back surface side to pass therethrough and a light reflection portion which constitutes a region in which an external light such as sun beams is reflected on each pixel region.

The light transmission portion is formed of a region which constitutes the pixel electrode using a light-transmitting conductive layer and the light reflection portion is formed of a region which constitutes the pixel electrode using a non-light-transmitting conductive layer having a light-reflecting function.

In the liquid crystal display device having such a constitution, the liquid crystal display device can be used in a light transmission mode by turning on the backlight and, at the same time, the liquid crystal display device can be used in a light reflection mode by making use of an external light such as sun beams.

However, in the liquid crystal display device having such a constitution, with respect to an optical path which passes through a light transmission portion and an optical path which is reflected on a light reflection portion, the latter optical path has to pass through the color filter twice, while the former optical path passes through the color filter once. Accordingly, these optical paths are not constituted in the same direction.

Accordingly, the color balance is not uniform between a case in which the liquid crystal display device is used in the light transmission mode and a case in which the liquid crystal display device is used in the light reflection mode. Further, it has been pointed out that it is difficult for the liquid crystal display device to perform the color balance adjustment in a suitable manner.

The present invention has been made in view of such circumstances and it is an object of the present invention to provide a liquid crystal display device which is capable of suitably performing the color balance adjustment.

SUMMARY OF THE INVENTION

To simply explain the summary of typical examples among inventions which are disclosed in the specification, they are as follows.

Means 1.

A liquid crystal display device according to the present invention, for example, comprises pixel regions each of which includes a light reflection portion and a light transmission portion on a liquid-crystal-side surface of one substrate out of respective substrates which are arranged to face each other in an opposed manner while sandwiching liquid crystal therebetween, wherein color filters are formed in pixel regions on a liquid-crystal-side surface of the other substrate out of the respective substrates, and each color filter of at least one color is provided with an opening or a notch at a part of a portion which faces the light reflection portion in an opposed manner, material layers having a layer thickness which is substantially equal to a height of step generated by the color filters in regions which face the opening or the notch of the each color filter in an opposed manner are formed on the liquid-crystal-side surface of the one substrate.

Means 2.

A liquid crystal display device according to the present invention, for example, comprises pixel regions each of which includes a light reflection portion and a light transmission portion on a liquid-crystal-side surface of one substrate out of respective substrates which are arranged to face each other in an opposed manner while sandwiching liquid crystal therebetween, wherein color filters are formed in pixel regions on a liquid-crystal-side surface of the other substrate out of the respective substrates, and each color filter of at least one color is provided with a plurality of openings which are scattered at a portion which faces the light reflection portion in an opposed manner.

Means 3.

A liquid crystal display device according to the present invention is, in the premise of the constitution of the means 2, for example, characterized in that a diameter of the openings is set to equal to or less than 20 μm.

Means 4.

A liquid crystal display device according to the present invention, for example, comprises pixel regions each of which includes a light reflection portion and a light transmission portion on a liquid-crystal-side surface of one substrate out of respective substrates which are arranged to face each other in an opposed manner while sandwiching liquid crystal therebetween, wherein color filters of different colors are formed on pixel regions which are disposed close to each other out of pixel regions on a liquid-crystal-side surface of the other substrate out of the respective substrates, and the color filter of at least one color is provided with an opening or a notch at a part of a portion thereof which faces the light reflection portion in an opposed manner, and at least one of the light transmission portions of respective pixel regions of the color filters of different colors differs in size from the other light transmission portions.

Means 5.

A liquid crystal display device according to the present invention, for example, comprises pixel regions each of which includes a light reflection portion and a light transmission portion on a liquid-crystal-side surface of one substrate out of respective substrates which are arranged to face each other in an opposed manner while sandwiching liquid crystal therebetween, wherein a black matrix having openings which are formed at least at portions of the respective pixel regions is formed on a liquid-crystal-side surface of the other substrate out of the respective substrates, and color filters of different colors are formed on the pixel regions which are disposed close to each other out of the respective pixel regions, the color filter of at least one color is provided with an opening or a notch at a portion thereof which faces the light reflection portion, the opening of the black matrix is different in size from an opening of the black matrix at other pixel region having the color filter of color which is different from the color of the color filter in the pixel region.

Means 6.

A liquid crystal display device according to the present invention, for example, comprises pixel regions each of which includes a light reflection portion and a light transmission portion on a liquid-crystal-side surface of one substrate out of respective substrates which are arranged to face each other in an opposed manner while sandwiching liquid crystal therebetween, wherein a black display is performed when an intensity of an electric field which is generated in the pixel region is small, color filters of different colors are formed on pixel regions which are disposed close to each other out of respective pixel regions on the liquid-crystal-side surface of the other substrate out of the respective substrates, and at least one of light transmission portions in respective pixel regions of the color filters of different colors differs in size from the other light transmission portion.

Means 7.

A liquid crystal display device according to the present invention, in the premise of any one of means 1 to 6, each pixel region is formed of a region which is surrounded by a pair of gate signal lines and a pair of drain signal lines, and a thin film transistor which is operated by scanning signals supplied from the gate signal line and a pixel electrode of the light transmission portion and a pixel electrode of the light reflection portion to which video signals from the drain signal line are supplied through the thin film transistor are formed on the pixel region.

Means 8.

A liquid crystal display device according to the present invention is, in the premise of any one of means 4, 5 and 6, characterized in that colors of the respective color filters having different colors are respectively formed of red, green and blue.

Means 9.

A liquid crystal display device according to the present invention is, in the premise of any one of means 4, 5 and 6, characterized in that colors of the respective color filters of different colors are respectively formed of cyan, magenta and yellow.

Means 10.

A liquid crystal display device according to the present invention is, in the premise of any one of means 4, 5 and 6, characterized in that an area of the light reflection portion of the pixel region on which the color filter of blue color is formed is set larger than an area of the light reflection portion of the pixel region on which the color filter of other color is formed.

Means 11.

A liquid crystal display device according to the present invention is, for example, in the premise of any one of means 4, 5 and 6, characterized in that an area of the light reflection portion of the pixel region on which the color filter of yellow color is formed is set smaller than an area of the light reflection portion of the pixel region on which the color filter of other color is formed.

Means 12.

A liquid crystal display device according to the present invention is, for example, in the premise of means 4, characterized in that a total area of the opening or the notch of the color filter in the one pixel differs depending on the color.

Means 13.

A liquid crystal display device according to the present invention is, for example, in the premise of any one of means 1 to 12, characterized in that the liquid crystal display device includes a backlight.

BRIEF DESCRIPTION OF THE DRAWINGS

FIG. 2 is a plan view showing one embodiment of an equivalent circuit of the whole liquid crystal display device according to the present invention.

FIG. 3 is a cross-sectional view taken along a line III-III of FIG. 1.

DESCRIPTION OF THE PREFERRED EMBODIMENTS

Figure 1:
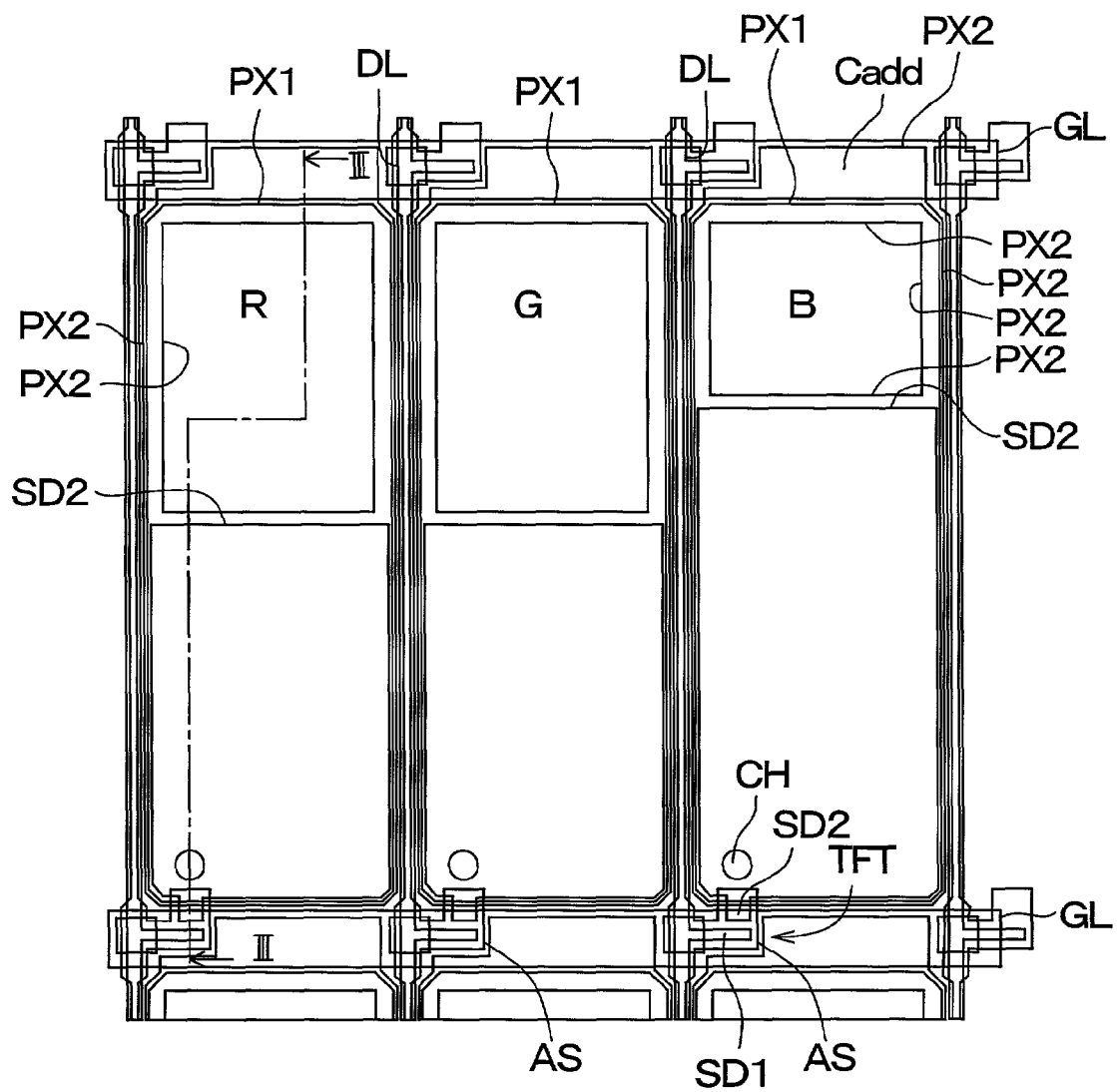
FIG. 1 is a plan view showing one embodiment of a pixel of a liquid crystal display device according to the present invention.

Embodiments of a liquid crystal display device according to the present invention are explained in detail in conjunction with drawings hereinafter.

Embodiment 1

<<Overall Equivalent Circuit>>

FIG. 2 is a plan view showing one embodiment of an overall equivalent circuit of a liquid crystal display device according to the present invention.

In the drawing, there are shown a pair of transparent substrates SUB1, SUB2 which are arranged to face each other in an opposed manner while inserting liquid crystal therebetween. The liquid crystal filled in a space defined between a pair of transparent substrates SUB1, SUB2 is sealed by a sealing member SL which is also served for fixing the other transparent substrate SUB2 to one transparent substrate SUB1.

On a liquid-crystal-side surface of one transparent substrate SUB1 which is surrounded by the sealing member SL, gate signal lines GL which are extended in the x direction and are arranged in the y direction in parallel and drain signal lines DL which are extended in the y direction and are arranged in the x direction in parallel are formed.

Regions which are surrounded by respective gate signal lines GL and respective drain signal lines DL constitute pixel regions and a liquid crystal display part AR is constituted by a mass of these respective pixel regions arranged in a matrix array.

On each pixel region, a thin film transistor TFT which is operated by the supply of scanning signals from the one-side gate signal line GL and a pixel electrode PX to which video signals are supplied from the one-side drain signal line DL by way of the thin film transistor TFT are formed.

The pixel electrode PX forms a capacitive element Cadd between the pixel electrode PX and other gate signal line GL which is different from the gate signal line GL for driving the thin film transistor TFT. Due to this capacitive element Cadd, the video signals supplied to the pixel electrode PX are stored for a relatively long time.

The pixel electrode PX is configured to generate an electric field between the pixel electrode PX and a counter electrode CT which is formed in common with respective pixel regions on the other transparent substrate SUB2 side. The light transmittivity of the liquid crystal can be controlled in response to this electric field.

Respective ends of the gate signal lines GL are extended over the sealing member SL and the extended ends constitute terminals to which output terminals of a vertical scanning driving circuit V are connected. Further, signals from a printed circuit board which is arranged outside the liquid crystal display device are inputted to input terminals of the vertical scanning driving circuit V.

The vertical scanning driving circuit V includes a plurality of semiconductor devices, wherein a plurality of neighboring gate signal lines GL are formed into a group and one semiconductor device is allocated to each group.

In the same manner, respective ends of the drain signal lines DL are extended over the sealing member SL and the extended ends constitute terminals to which output terminals of a video signal driving circuit He are connected. Further, signals from the printed circuit board which is arranged outside the liquid crystal display device are inputted to input terminals of the video signal driving circuit He.

This video signal driving circuit He also includes a plurality of semiconductor devices, wherein a plurality of neighboring drain signal lines DL are formed into a group and one semiconductor device is allocated to each group.

Respective gate signal lines GL are sequentially selected one by one in response to the scanning signals from the vertical scanning driving circuit V.

Further, the video signals are supplied to respective drain signal lines DL by the video signal driving circuit He while being matched with the timing of the selection of the gate signal lines GL.

A backlight BL is mounted on a back surface of the liquid crystal display device having such a constitution and this light source is turned on when the liquid crystal display device is used in a transmission mode.

Although the vertical scanning driving circuit V and the video signal driving circuit He are respectively mounted on the transparent substrate SUB1 in this embodiment, it is needless to say that the present invention is not limited to such a constitution and these circuits V, He may be provided outside the transparent substrate SUB1.

<<Constitution of Pixels>>

FIG. 1 is a plan view showing one embodiment of the pixel regions. Although respective pixels for R, G and B are shown in the drawing as pixels for color display, they substantially have the same constitution except for that they differ in color of color filters and the rates which the light reflection portion and the light transmission portion respectively occupy.

Following explanation is made by focusing on one pixel out of these three pixels. A cross section taken along a line III-III in FIG. 1 is shown in FIG. 3.

In the drawings, on a liquid-crystal-side surface of the transparent substrate SUB1, first of all, a pair of gate signal lines GL which are extended in the x direction and are arranged in parallel in the y direction are formed. These gate signal lines GL are, for example, made of Al (aluminum) and anodic oxidation films AOF are formed on surfaces of the gate signal lines GL.

These gate signal lines GL surround a rectangular region together with a pair of drain signal lines DL which will be explained later and this region constitutes a pixel region.

A light-transmitting pixel electrode (first pixel electrode) PX1 formed of an ITO (Indium-Tin-Oxide) film, for example, is formed on a central portion of the pixel region except for a trivial peripheral portion.

The pixel electrode PX1 functions as a pixel electrode in a region of the pixel region which allows light from a backlight BL to pass therethrough and is classified from a pixel electrode (second pixel electrode) PX2 which also functions as a reflection electrode as will be explained later.

On the surface of the transparent substrate SUB1 on which the gate signal lines GL and the pixel electrodes PX1 are formed, an insulation film GI made of, for example, SiN (silicon nitride) is formed. The insulation film GI is formed such that the insulation film GI is extended over regions where thin film transistors TFT are formed (partial regions of gate signal lines GL) and portions where the gate signal lines GL and the drain signal lines DL cross each other arranged in the vicinity of the thin-film-transistor forming regions.

The insulation film GI which is formed over the regions where thin film transistors TFT are formed functions as a gate insulation film of the thin film transistors TFT and the insulation film GI which is formed over the portions where the gate signal lines GL and the drain signal lines DL cross each other functions as an interlayer insulation film.

On a surface of the insulation film GI, a semiconductor layer AS made of amorphous Si (silicon) is formed.

The semiconductor layer AS constitutes a semiconductor layer of the thin film transistor TFT. That is, by forming a drain electrode SD1 and a source electrode SD2 on the semiconductor layer AS, an MIS transistor having an inverse stagger structure which uses a portion of the gate signal line GL as a gate electrode can be formed.

The semiconductor layer AS is formed such that the semiconductor layer AS is also extended over the portion where the gate signal line GL and the drain signal line DL cross each other thus strengthening the function of these signal lines as the interlayer insulation film together with the insulation film GI.

Further, although not explicitly shown in FIG. 3, above the surface of the semiconductor layer AS and in a boundary between the drain electrode SD1 and the source electrode SD2, a semiconductor layer doped with impurity (for example, phosphorus) of high concentration is formed and a contact layer d0 is formed of this semiconductor layer.

The drain electrode SD1 and the source electrode SD2 are formed simultaneously with the formation of the drain signal lines DL.

That is, the drain signal lines DL which are extended in the y direction and are arranged in parallel in the x direction are formed, a portion of each drain signal line DL is extended over an upper surface of the semiconductor layer AS thus forming the drain electrode SD1, and the source electrode SD2 is formed spaced apart from the drain electrode SD1 by a channel length of the thin film transistor TFT.

The drain signal line DL is constituted of a sequentially laminated body made of Cr and Al, for example.

The source electrode SD2 is slightly extended from the semiconductor layer AS surface such that the source electrode SD2 reaches the pixel region side thus establishing the electric connection between the source electrode SD2 and the pixel electrode PX1. Further, the source electrode SD2 is provided with a contact portion to establish the electric connection between the source electrode SD2 and the pixel electrode PX2 which also functions as a reflection electrode as will be explained later.

Here, the extension portion of the source electrode SD2 not only performs the function of connecting the source electrode SD2 to the pixel electrodes PX1 and PX2 as mentioned above but also is extended over a major portion of a light reflection portion (region where the pixel electrode PX2 is formed as will be explained later) such that the difference in height due to a step does not appear remarkably in the pixel electrode PX2 in the light reflection portion.

That is, when the extension portion of the source electrode SD2 is provided with only the function of connecting the source electrode SD2 to the pixel electrodes PX1 and PX2, it is sufficient to form the extension portion as a contact portion and hence, the extension portion becomes relatively short. Accordingly, a step formed around the extension portion explicitly appears on a surface which forms the pixel electrode PX2 which also functions as the reflection electrode as will be explained later (upper surface of a protective film PSV which will be explained later) so that a step is also formed on a surface of the pixel electrode PX2.

Further, with the use of the constitution of this embodiment, the extension portion of the source electrode SD2 occupies a region of relatively large area and this implies that the side is relatively elongated.

Accordingly, in the fabrication of the liquid crystal display device, impurities such as dusts hardly remain in the vicinity of the pixel electrode PX2 so that the drawbacks derived from the impurities can be obviated.

Here, with respect to the source electrode of the thin film transistor TFT which functions as the contact portion, the area of the contact portion is small and the side thereof is formed in a slightly complicated shape due to the selective etching using a photolithography technique and hence, impurities such as dusts remain here so that the function of the source electrode as the contact portion has been often damaged.

Over the surface of the transparent substrate SUB1 on which the drain signal lines DL and the drain electrodes SD1 and the source electrodes SD2 of the thin film transistors TFT are formed, a protective film PSV made of SiN, for example, is formed. This protective film PSV is a layer which avoids the direct contact of the thin film transistor TFT with the liquid crystal LC and is served for preventing the deterioration of the characteristics of the thin film transistors TFT.

Further, in the protective film PSV, the contact holes CH are formed. A portion of the source electrode SD2 of the thin film transistor TFT is exposed through each contact hole CH.

On an upper surface of the protective film PSV, the pixel electrodes PX2 which also function as the reflection electrodes are formed. Each pixel electrode PX2 is formed of a non-light transmitting conductive film consisting of a sequential laminating body made of Cr and Al, for example.

The pixel electrode PX2 is formed such that the pixel electrode PX2 occupies a major portion of the pixel region except for the region which constitutes the light transmission portion.

Due to such a constitution, the region on which the pixel electrode PX2 is formed functions as the light reflection portion in the pixel region and the region where the pixel electrode PX1 which is exposed (as viewed in a plan view) from the pixel electrode PX2 is formed functions as the light transmission portion.

Here, in this embodiment, an area which the light transmission portion of the pixel region which is in charge of blue color (B) occupies is set smaller than an area which the light transmission portion of the pixel region which is in charge of other color (R, G) occupies. In other words, the area of the second pixel electrode PX2 of the pixel region which is in charge of blue color is set larger than the area of the second pixel electrode PX2 which is in charge of the other color.

The reason of setting the areas in such a manner is that it is suitable for mixing of three primary colors to decrease a quantity of light from the backlight BL which is irradiated through the light transmission portion when the color filter is blue and the mixing of three primary colors becomes more appropriate by suitably setting the rate of a quantity of light of the light transmission portion with respect to the light reflection portion.

When cyan, magenta and yellow are used as colors of the color filters FIL, contrary to the case that the blue is used as the color of the color filter FIL, the area of the second pixel electrode PX2 of the pixel region which is in charge of yellow is set smaller than the area of the second pixel electrode PX2 of the pixel region which is in charge of other color.

The pixel electrode PX2 has a portion thereof electrically connected to the source electrode SD2 of the thin film transistor TFT through the contact hole CH which is partially formed in the portion of the protective film PSV.

Further, the pixel electrode PX2 is formed such that the pixel electrode PX2 is extended to a position where the pixel electrode PX2 is superposed on other neighboring gate signal line GL which is different from the gate signal line GL for driving the above-mentioned thin film transistor TFT. The capacitive element Cadd which uses the protective film PSV as an dielectric film is formed in the extension portion of the pixel electrode PX2.

Over the upper surface of the transparent substrate SUB1 on which the pixel electrodes PX2 are formed, an orientation film (not shown in the drawing) is formed such that the orientation film also covers the pixel electrodes PX2 and the like. The orientation film is a film which is directly brought into contact with the liquid crystal LC and determines the initial orientation direction of molecules of the liquid crystal LC by rubbing a surface thereof.

The transparent substrate SUB2 is arranged to face the transparent substrate SUB1 having such a constitution in an opposed manner while sandwiching the liquid crystal LC therebetween. On a liquid-crystal-side surface of the transparent substrate SUB2, a black matrix BM is formed such that the black matrix BM defines respective pixel regions. That is, the black matrix BM which is formed over at least the liquid crystal display part AR is provided with a pattern which forms openings in regions except for peripheral portions of respective pixel regions (at least partial regions of respective pixel regions) thus enhancing the contrast of display.

Further, the black matrix BM is formed such that the black matrix BM sufficiently covers the thin film transistors TFT of the transparent substrate SUB1 side so that it is possible to prevent an external light from being irradiated to the thin film transistors TFT whereby the deterioration of the characteristics of the thin film transistors TFT can be obviated. The black matrix BM is formed of a resin film which contains black pigment therein, for example.

Over the surface of the transparent substrate SUB2 on which the black matrix BM is formed, color filters FIL are formed such that these color filters FIL cover the openings formed in the black matrix BM. These color filters FIL are constituted of filters of respective colors consisting of red (R), green (G) and blue (B), for example. Here, the red filter, for example, is formed in common with respect to a group of respective pixel regions which are arranged in parallel in the y direction, while with respect to such groups of pixel regions which are arranged in the x direction, they are sequentially arranged in the order of red (R), green (G), blue (B), red (R), . . . . These respective filters are formed of resin films which contain pigments corresponding to respective colors. It is needless to say that cyan, magenta, yellow may be used as colors of respective filters.

Figure 4A:
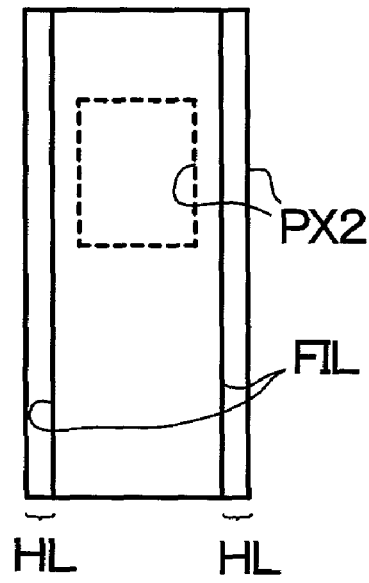
FIG. 4A to FIG. 4D are plan views showing respective embodiments of the constitution of the color filter in each pixel of the liquid crystal display device according to the present invention.

Here, in this embodiment, the color filter FIL is formed at a portion of the pixel region. For example, as shown in FIG. 4A, the color filter FIL is formed at a central portion of the pixel region except for the left and right portions of the pixel region. In other words, opening portions (or notches) HL are formed in portions of the color filter FIL which face portions (left and right portions of the pixel region) of the second pixel electrode PX2.

The reason that the color filter FIL is constituted in the above-mentioned manner is that the brightness of respective pixels at the time of reflection can be adjusted from a viewpoint of mixing of three primary colors. Accordingly, even when the brightness cannot be adjusted by merely changing the area ratio of the light transmission portion and the light reflection portion depending on color, the balance of color and the adjustment of brightness can be performed so that the degree of freedom can be increased. Further, the area of the opening portions HL may differ from the area of the opening portions HL of the color filter FIL of the other neighboring pixel region of different color.

In this case, it is confirmed that by setting the area of the opening portions HL of the color filter FIL of blue color smaller than the area of the opening portions HL of the color filter FIL of other color, the adjustment of color is facilitated. Based on this confirmation, as another example, the opening portions HL are not specifically formed in the blue color filter FIL and the opening portions HL may be formed in the color filter FIL of other color.

By constituting the color filters FIL in this manner, the balance adjustment of colors can be performed. Accordingly, as mentioned previously, the area of the light transmission portion of the pixel region which is in charge of blue color can be set equal to the area of the light transmission portion of the pixel region which is in charge of other color, for example, without setting the area of the light transmission portion of the pixel region which is in charge of blue color smaller than the area of the light transmission portion of the pixel region which is in charge of other color. It is needless to say that these areas can be set different from each other.

Contrary to the case of the blue color filter, with respect to the case of the yellow color filter, the opening portion HL of the yellow color filter FIL is set larger than the opening portion HL of other color filter FIL.

Although the formation of the opening portion HL in the color filter FIL may obstruct the uniformity of the layer thickness of the liquid crystal LC, since the step is sufficiently eliminated at the transparent substrate SUB1 side as mentioned previously, it is possible to suppress the step within a range in which the step brings about any practical problems.

Over the surface of the transparent substrate SUB2 on which the black matrix BM and the color filters FIL are formed, a flattening film OC is formed such that the flattening film OC also covers the black matrix BM and the color filters FIL. The flattening film OC is a resin film which is formed by coating and is served for decreasing steps which become apparent due to the formation of the black matrix BM and the color filters FIL.

Over an upper surface of the flattening film OC, a light transmitting conductive film made of an ITO film, for example, is formed. A counter electrode CT which corresponds to respective pixel regions in common is formed of this conductive film.

Over a surface of the counter electrode CT, an orientation film (not shown in the drawing) is formed. The orientation film is a film which is directly brought into contact with the liquid crystal LC and determines the initial orientation direction of molecules of the liquid crystal LC by rubbing a surface thereof.

In the liquid crystal display device having such a constitution, the source electrode SD2 of each thin film transistor TFT is formed such that the source electrode SD2 is extended to a region corresponding to the light reflection portion of the pixel region.

Accordingly, the pixel electrode PX2 which is formed on the light reflection portion by way of the protective film PSV can be formed in a flattened shape with no difference in height derived from the steps.

This enables the liquid crystal to have a uniform layer thickness in the light reflection portion so that the reduction of contrast which is generated due to the irregularities of the layer thickness can be drastically suppressed.

Further, although it is not directly relevant to the light reflection portion, the height of the pixel electrode PX2 with respect to the transparent substrate SUB1 in the portion where the capacitive element Cadd is formed can be set substantially equal to the height of the pixel electrode PX2 with respect to the transparent substrate SUB1 in the light reflection portion.

Although a portion on which the capacitive element Cadd is formed constitutes a portion covered with the black matrix BM, at a portion which is disposed in the inside of the opening portion of the black matrix BM and is disposed close to the capacitive element Cadd, it is possible to prevent the generation of the influence derived from the difference in height of the pixel electrode PX2 with respect to the transparent substrate SUB1.

Accordingly, by setting the difference between "the layer thickness of the gate signal line GL" which constitutes a portion of the capacitive element Cadd and "the total layer thickness of the pixel electrode PX1 and the source electrode SD2 of the thin film transistor TFT below the light reflection portion" to equal to or less than 0.1 µm, it is possible to restrict the irregularities of height of the pixel electrode PX2 with respect to the transparent substrate SUB1 to equal to or less than 0.1 μm.

Due to such a constitution, the layer thickness of the liquid crystal LC can be substantially made uniform in the light reflection portion of the pixel region and hence, the reduction of the contrast can be suppressed.

In the above-mentioned embodiment, the source electrode SD2 of each thin film transistor TFT is sufficiently extended over the region of the light reflection portion so as to prevent the generation of the step of the pixel electrode PX2 which is formed on the source electrode SD2.

However, it is needless to say that the same advantageous effect can be obtained by using other material layer which is electrically (or physically) separated from the source electrode SD2.

In this case, since the film thickness of the material layer can be set irrespective of the source electrode SD2 of the thin film transistor TFT, an advantageous effect that the flattening of the pixel electrode PX2 can be easily achieved is obtained.

Figure 4B:
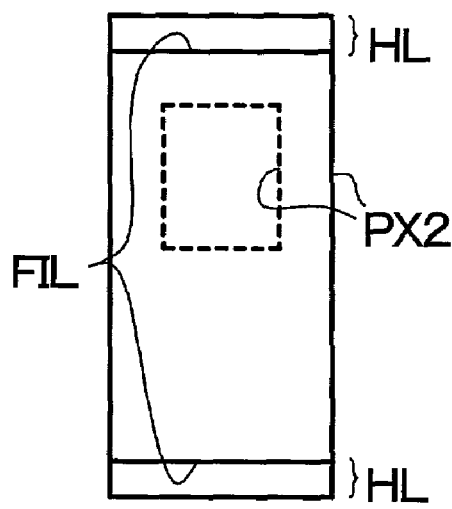
Figure 4C:
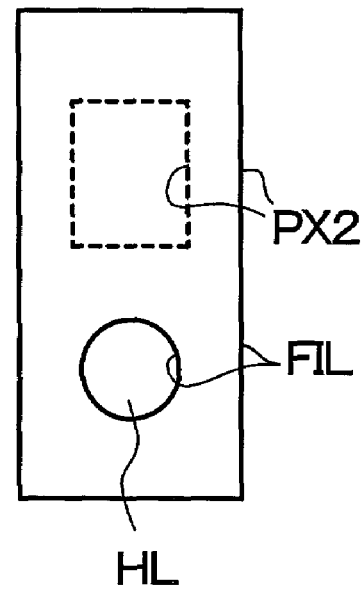

Further, in the above-mentioned embodiment, as shown in FIG. 4A, the color filter FIL is arranged such that the opening portions (notches) HL are formed at left and right portion of the pixel region which are portions facing the second pixel electrode PX2 in an opposed manner. However, it is needless to say that, for example, as shown in FIG. 4B, openings HL may be formed at upper and lower portions of the pixel region which are portions facing the second pixel electrode PX2 in an opposed manner. Further, it is also needless to say that, as shown in FIG. 4C, an opening HL having a relatively large area may be formed at an approximately central portion of the pixel region. Further, as shown in FIG. 4D, it is needless to say that a plurality of small openings HL having a diameter of equal to or less than 20 μm, for example, may be formed at an approximately central portion of the pixel region in a scattered manner.

Figure 4D:
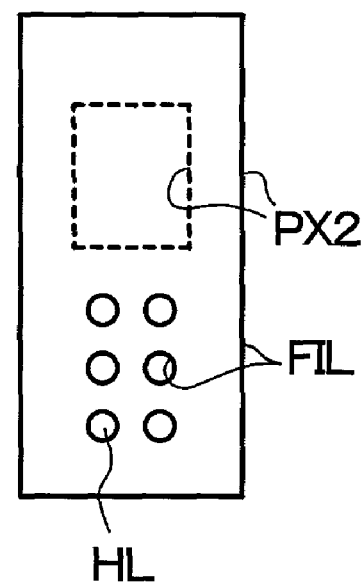

By adopting the constitution shown in FIG. 4D, the influence of the openings HL of the color filter FIL to the step can be decreased so that it is possible to make the layer thickness of the liquid crystal uniform.

In this case, with respect to the color filters FIL of respective colors, as has been explained previously, the area of the opening of the blue color filter FIL may be set small or the blue color filter FIL is not provided with the opening.

<<Fabricating Method>>

Hereinafter, one embodiment of the fabricating method of the transparent-substrate-SUB1 side of the above-mentioned liquid crystal display device is explained in conjunction with FIG. 5A to FIG. 5F.

Figure 5A:
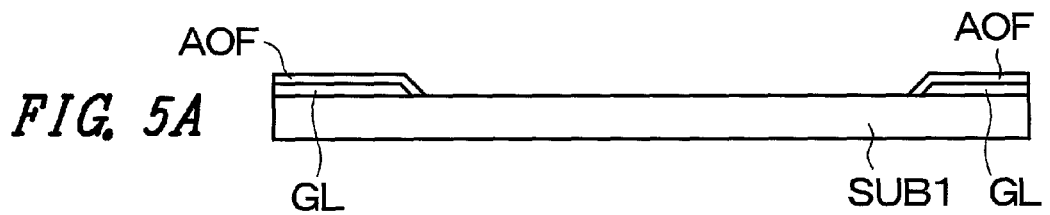
FIG. 5A to FIG. 5F are process flow views showing one embodiment of a manufacturing method of the liquid crystal display device according to the present invention.

Step 1. (FIG. 5A)

The transparent substrate SUB1 was prepared and an Al film having a film thickness of approximately 300 nm was formed on a main surface (liquid-crystal-side surface) of the transparent substrate SUB1 by a sputtering method, for example. Then, the Al film was selectively etched using a photolithography technique so as to form the gate signal lines GL. For example, a mixed solution of phosphoric acid, hydrochloric acid and nitric acid is used as an etchant for Al.

Then, the gate signal lines GL were subjected to the anodic oxidation in a tartaric acid solution so as to form anodic oxidation films AOF on the surface of the gate signal lines GL. It is preferable to set a film thickness of the anodic oxidation films AOF to approximately 180 nm.

Figure 5B:
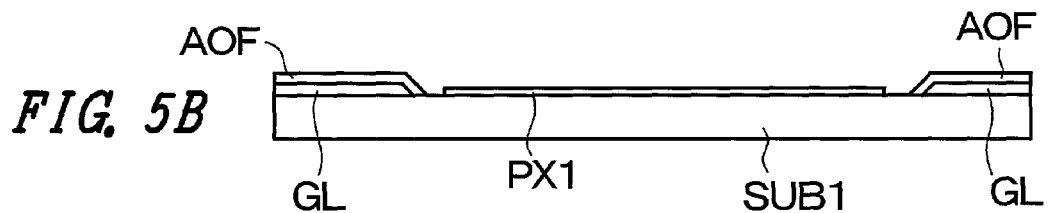

Step 2. (FIG. 5B)

On the main surface of the transparent substrate SUB1 on which the gate signal lines GL were formed, a light-transmitting conductive film formed of an ITO (Indium-Tin-Oxide) film, for example, and having a film thickness of approximately 100 nm was formed and the conductive film was selectively etched by a photolithography technique so as to form the pixel electrodes PX1. As an etchant, for example, an aqua regia solution is used.

Figure 5C:
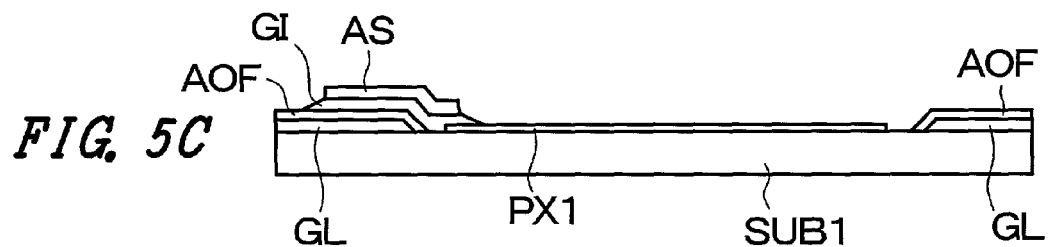

Step 3. (FIG. 5C)

The insulation film made of SiN having a film thickness of approximately 240 nm was formed on the main surface of the transparent substrate SUB1 on which the pixel electrodes PX1 were formed using a CVD method, for example. In the same manner, an amorphous silicon layer having a film thickness of approximately 200 nm was formed on the insulation film and, thereafter, an $n^+$-type amorphous silicon layer doped with phosphorus (P) and having a film thickness of approximately 35 nm was formed on the amorphous silicon film.

Then, the selective etching was performed using a photolithography technique to etch the semiconductor layer and the insulation film together so as to form the insulation film GI and the semiconductor layers AS. As such an etching, a dry etching which uses a sulfur hexafluoride gas is suitable.

Here, since the etching speed of the amorphous silicon is greater than the etching speed of the insulation film, a normal taper having an angle of approximately 4° is provided to sides which constitute a profile of the insulation film GI and a normal taper having an angle of approximately 70° is provided to sides which constitute a profile of the semiconductor layer AS.

Figure 5D:
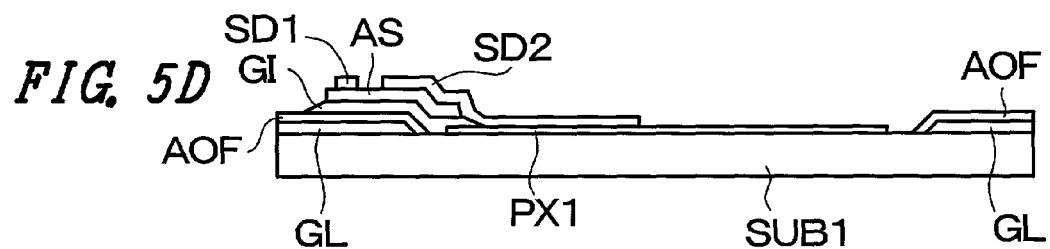

Step 4. (FIG. 5D)

A Cr layer and an Al layer were sequentially formed on the main surface of the transparent substrate SUB1 on which the insulation film GI and the semiconductor layers AS were formed using a sputtering method, for example. Here, it is preferable to set a film thickness of the Cr layer to 30 nm and a film thickness of the Al layer to 200 nm.

Thereafter, the selective etching was performed using a photolithography technique so as to form the drain signal lines DL and the drain electrodes SD1 and the source electrodes SD2 of the thin film transistors TFT having a two-layered structure.

Here, it is preferable to use a mixed solution of phosphoric acid, hydrochloric acid and nitric acid as an etchant for Al, while it is preferable to use a cerium nitrate ammonium solution as an etchant for Cr.

Then, using the drain electrodes SD1 and the source electrodes SD2 of the patterned thin film transistors TFT as masks, the $n^+$-type amorphous silicon layers formed on the surface of the semiconductor layers AS exposed from the masks were etched. Here, it is preferable to adopt a dry etching which uses a sulfur hexafluoride gas as an etchant.

Figure 5E:
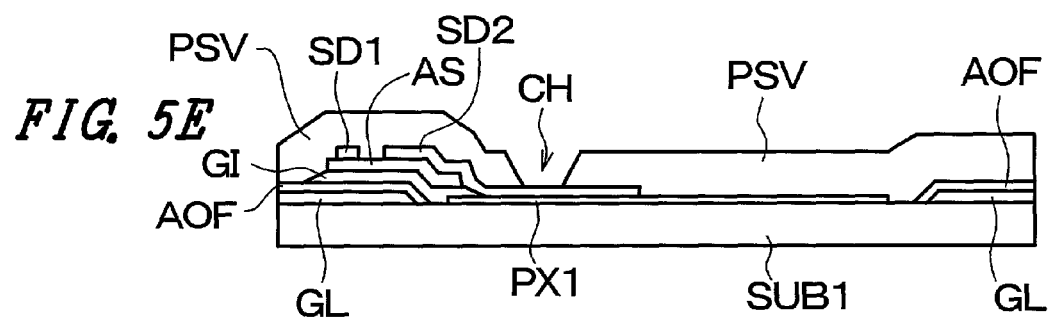

Step 5. (FIG. 5E)

On the main surface of the transparent substrate SUB1 on which the drain signal lines DL and the drain electrodes SD1 and the source electrodes SD2 of the thin film transistors TFT were formed, an SiN film having a film thickness of approximately 600 nm was formed using a CVD method, for example, and the SiN film was selectively etched using a photolithography technique to form the protective film PSV.

In performing such an etching, the contact holes CH which expose the portions of the extension portions of source electrodes SD2 of the thin film transistors TFT were simultaneously formed.

Figure 5F:
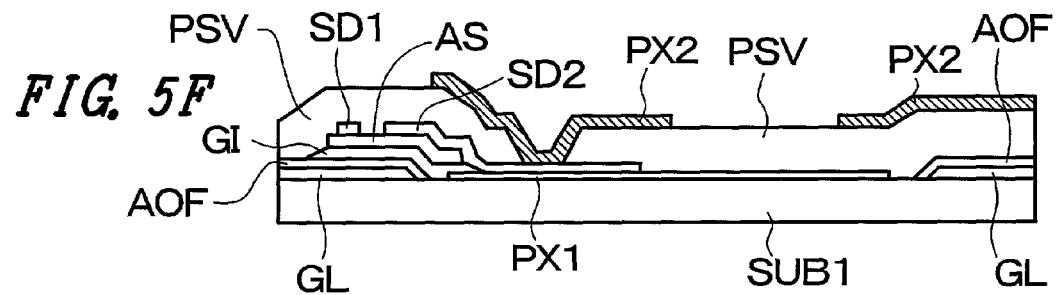

Step 6. (FIG. 5F)

A Cr layer and an Al layer having a film thickness of approximately 30 nm and approximately 200 nm respectively, were sequentially formed on the main surface of the transparent substrate SUB1 on which the protection film PSV was formed using a sputtering method, for example. Then, the Cr layer and the Al layer were selectively etched using a photolithography technique to form the pixel electrodes PX2 which also function as the reflection electrodes.

Here, it is preferable to use a mixed solution of phosphoric acid, hydrochloric acid and nitric acid as an etchant for Al, while it is preferable to use an ammonium cerium nitrate solution as an etchant for Cr.

In this case, openings were formed in the pixel electrodes PX2 such that each opening occupies approximately a half of the pixel region.

In place of sequentially forming the Cr layer and the Al layer to form the pixel electrodes PX2, an Mo alloy layer and an Al layer may be sequentially formed or an Mo alloy layer and an Al alloy layer may be sequentially formed. It is preferable to use MoCr as the Mo alloy. This is advantageous since the etching can be performed at one time.

Embodiment 2

FIG. 6A to FIG. 6E, FIG. 7A and FIG. 7B are respectively constitutional views of other embodiments of the liquid crystal display device according to the present invention and correspond to FIG. 3.

Figure 6A:
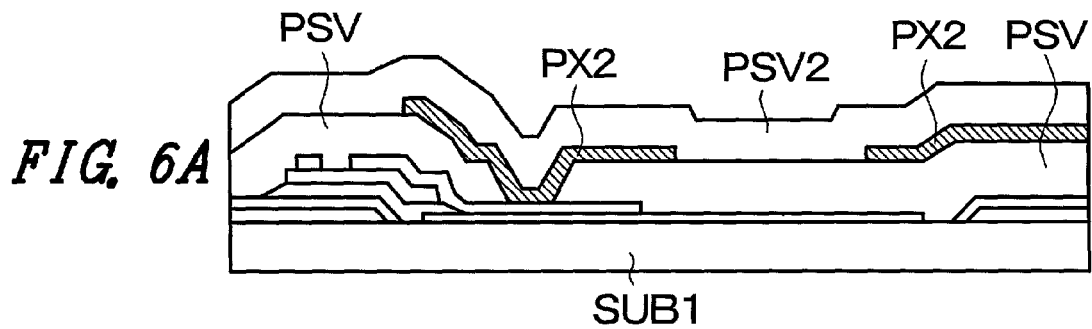
FIG. 6A to FIG. 6E are cross-sectional views showing another embodiment of the pixel of the liquid crystal display device according to the present invention.
Figure 6B:
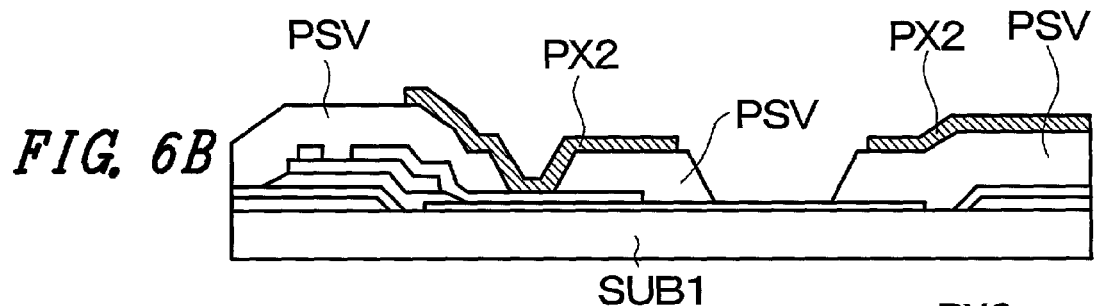
Figure 6C:
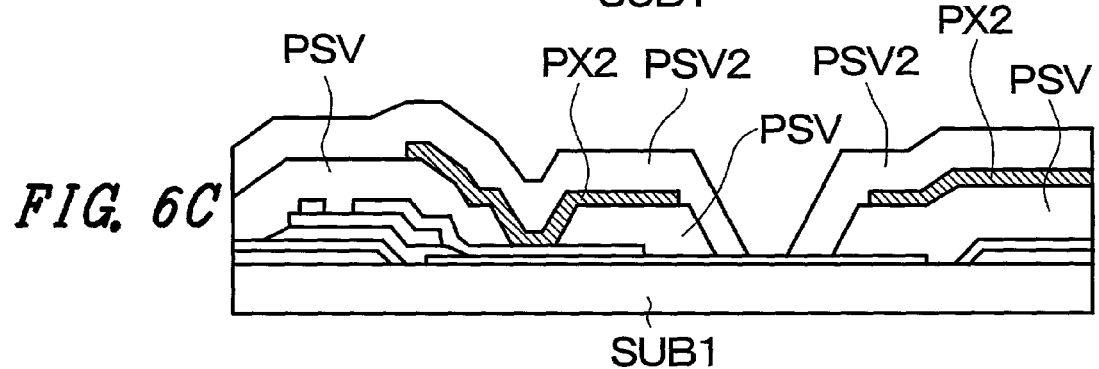
Figure 6D:
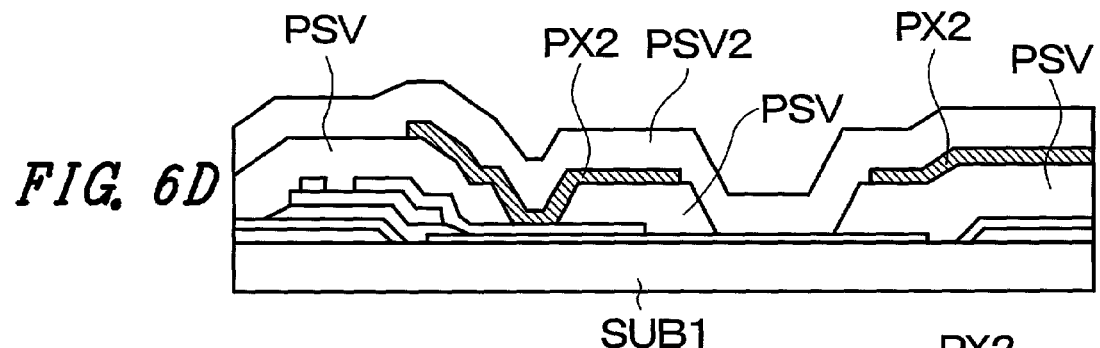
Figure 6E:
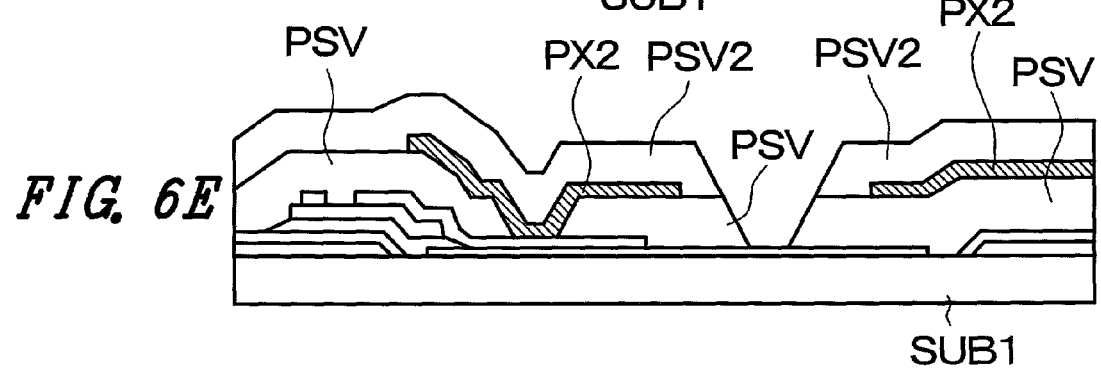

FIG. 6A shows a constitution in which a second protective film PSV2 is formed over an upper surface of a pixel electrode PX2 such that the second protective film PSV2 also covers the pixel electrode PX2. FIG. 6B shows a constitution in which an opening is formed in a protective film PSV in a region corresponding to a light transmission portion. FIG. 6C shows a constitution in which a second protective film PSV2 is formed on an upper surface of a pixel electrode PX2 such that the second protective film PSV2 also covers the pixel electrode PX2 and openings are formed in both of the protective film PSV and the second protective film PSV2 at a region corresponding to a light transmission portion. FIG. 6D shows a constitution in which a second protective film PSV2 is formed on an upper surface of a pixel electrode PX2 such that the second protective film PSV2 also covers the pixel electrode PX2 and an opening is formed only on a protective film PSV at a region corresponding to a light transmission portion. FIG. 6E shows a constitution in which a second protective film PSV2 is formed on an upper surface of a pixel electrode PX2 such that the second protective film PSV2 also covers the pixel electrode PX2 and a unitary opening is formed in both of a protective film PSV and the second protective film PSV2 at a region corresponding to a light transmission portion.

Figure 7A:
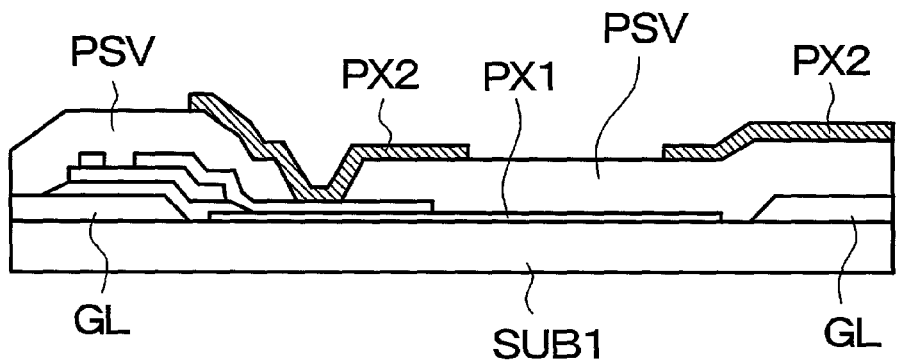
FIG. 7A and FIG. 7B are cross-sectional views showing another embodiment of the pixel of the liquid crystal display device according to the present invention.

Further, FIG. 7A shows a constitution in which a surface of a gate electrode GL is formed of metal other than an anodized Al layer. Such metal is formed of an alloy layer made of Mo and Cr, for example.

Figure 7B:
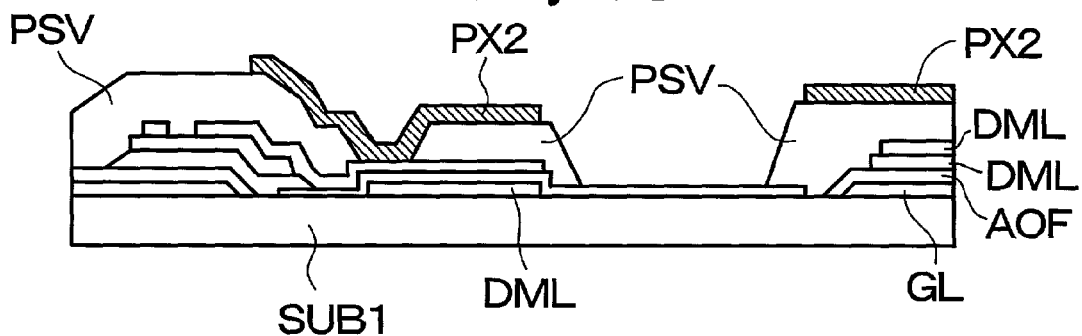

Further, a constitution shown in FIG. 7B differs from the constitution shown in FIG. 3 in that material layers DML for adjusting height are formed in a portion where a light reflection portion and a capacitive element Cadd are formed.

Due to such a constitution, it is possible to set the difference in height of respective pixel electrodes PX2 with respect to the transparent substrate SUB1 at respective portions to equal to or less than 0.1 µm.

In this manner, as shown in the drawing, it is unnecessary to respectively form the material layers DML for adjusting height at portions where the light reflection portion and the capacitive element Cadd are formed and it is needless to say that the material layer DML may be formed on either one of these portions.

Embodiment 3

Figure 8:
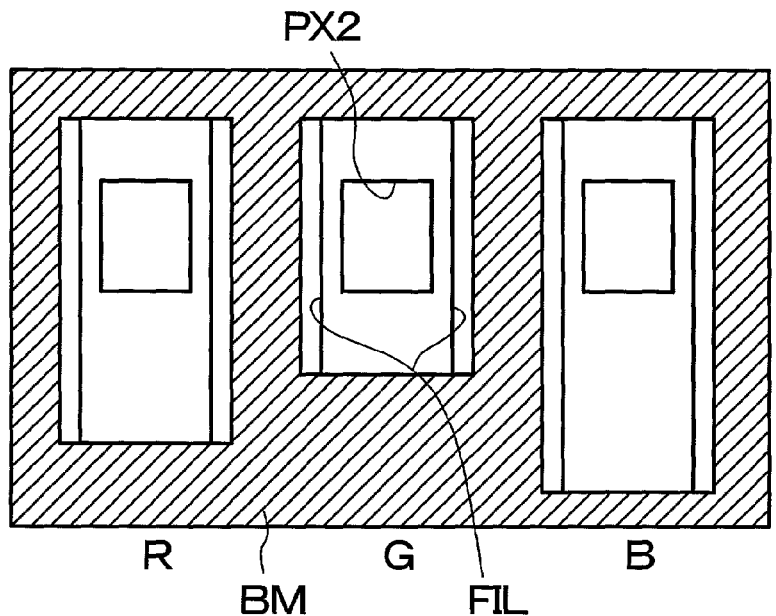
FIG. 8 is a plan view showing one embodiment of the constitution of a black matrix in each pixel of the liquid crystal display device according to the present invention.

FIG. 8 is a constitutional view showing an embodiment of the liquid crystal display device according to the present invention and also is a plan view showing a pattern of a black matrix BM which is formed on respective pixels of color display.

In the drawing, openings formed in respective pixels (respective pixels for R display, G display and B display) of the black matrix BM have areas which are different from each other.

By forming the openings (notches) in color filters FIL, it is possible to perform the color balance adjustment and, at the same time, the color balance adjustment is also performed by openings formed in the black matrix BM with respect to respective pixels. Due to such a constitution, it is possible to obtain an advantageous effect that the degree of freedom of the color balance adjustment is increased.

This embodiment may be constituted in the premise of the constitutions of the above-mentioned embodiments or may be constituted such that this embodiment is combined with the partial constitutions of the above-mentioned respective embodiments.

Embodiment 4

Further, in the premise of the constitutions of the above-mentioned respective embodiments, a so-called "normally black mode" which exhibits a black display when there is no potential difference between a pixel electrode PX and a counter electrode CT may be adopted.

It has been confirmed that the normally black mode is liable to suffer from a so-called "coloration" due to the non-uniformity of the layer thickness of liquid crystal compared to the normally white mode.

The above-mentioned embodiment can achieve the flattening at a liquid-crystal-side surface of a transparent substrate SUB1. Accordingly, even when the liquid crystal display device adopts the normally black mode, it is possible to provide the liquid crystal display device which hardly generates the coloration due to the adoption of the normally black mode.

In this case, it is needless to say that it is not always necessary to form openings for color balance adjustment in color filters FIL or a black matrix BM.

Embodiment 5

Figure 9:
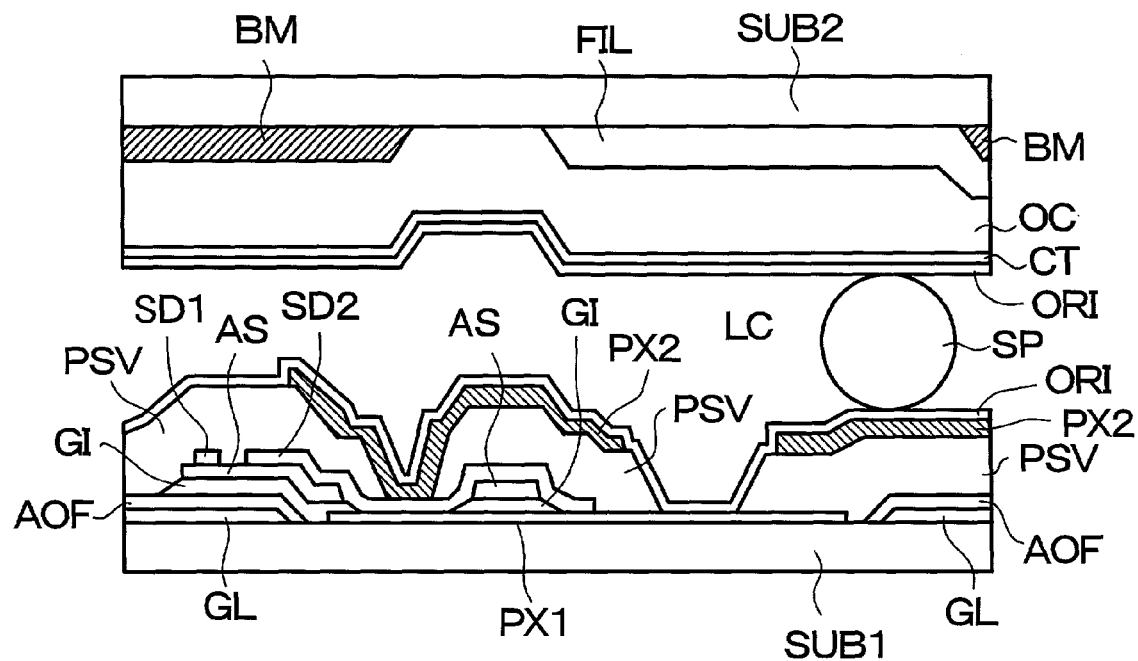
FIG. 9 is a cross-sectional view showing other embodiment of the liquid crystal display device according to the present invention.

FIG. 9 is a cross-sectional view of another embodiment of the pixel of the liquid crystal display device according to the present invention and corresponds to FIG. 3. In FIG. 9, orientation films ORI are also illustrated.

An opening (or a notch) is formed in each color filter FIL which is formed at a transparent substrate SUB2 side, while on a liquid-crystal-side surface of a transparent substrate SUB1 side, at a region which faces the opening (or the notch) in an opposed manner, a material layer having a layer thickness which is substantially equal to a height of step formed by the opening (notch) of the color filter FIL is formed.

In this embodiment, the material layer is constituted of a laminated body made of an insulation film GI and a semiconductor layer AS which is formed between a first pixel electrode PX1 and a source electrode SD2 by patterning.

In this case, due to the formation of the material layer, it is possible to prevent the layer thickness of liquid crystal LC at the opening of the color filter FIL from being changed from the layer thickness of liquid crystal LC in the periphery of the opening.

That is, provided that a gap between the transparent substrate SUB2 and the transparent substrate SUB1 is ensured by interposing spacers SP made of beads, for example, the increase of the layer thickness of liquid crystal LC at the opening portion of the color filter FIL is prevented by providing a protrusion made of the material layer at the transparent substrate SUB1 side.

Here, in this embodiment, a flattening film OC is formed on a surface of the transparent substrate SUB2 on which the color filters FIL are formed such that the flattening film OC also covers the color filters FIL.

Accordingly, the step which is generated by the opening or the notch of the color filter FIL which appears on a front surface of the flattening film OC can be made smaller than the layer thickness of the color filter FIL. Accordingly, it is possible to make the layer thickness of the material layer smaller than the layer thickness of the color filter FIL.

Here, it is needless to say that the constitution of this embodiment can be used in combination with the constitutions explained in the above-mentioned other embodiments.

Embodiment 6

Figure 10:
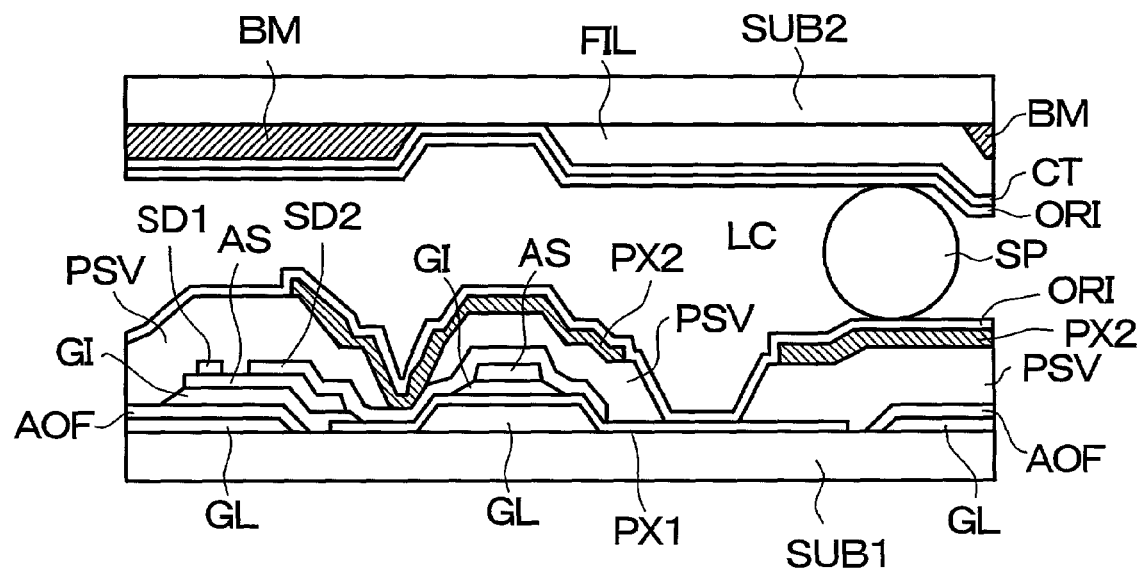
FIG. 10 is cross-sectional view showing other embodiment of the liquid crystal display device according to the present invention.

FIG. 10 is a cross-sectional view showing another embodiment of the pixel of the liquid crystal display device according to the present invention and corresponds to FIG. 9.

The constitution of this embodiment differs from the constitution of FIG. 9 in that, first of all, a flattening film OC is not formed on a transparent substrate SUB2 side.

Accordingly, the step of an opening (notch) formed in a color filter FIL becomes larger than the opening (notch) explained in conjunction with Embodiment 5.

Accordingly, material for forming gate signal lines GL is also laminated to a transparent substrate SUB1 side besides the above-mentioned material layer and the total height of the laminated body is set to match the step of the above-mentioned opening (notch).

As has been clearly understood from the foregoing explanation, according to the liquid crystal display device of the present invention, the color balance adjustment can be suitably performed.

What is claimed is:

1. A liquid crystal display device comprising:
   a first substrate and a second substrate;
   liquid crystal sandwiched between the first substrate and the second substrate; and
   a plurality of pixels each of which includes a light reflection portion, a light transmission portion and a color filter;
   wherein the color filter has a plurality of openings in one pixel, the plurality of openings are completely circular in shape and the plurality of openings of the color filter are superposed on the light reflection portion,
   the openings are arranged in rectangular matrix shape having long and shorter directions, and the number of the openings is larger in the longer direction than in the shorter direction,
   a flattening film is formed on the color filter so as to flatten a step formed by the openings of the color filter, and
   a diameter of the openings of the color filter is set equal to or less than 20 µm.

2. A liquid crystal display device according to claim 1, wherein the liquid crystal display device includes a backlight.

3. A liquid crystal display device according to claim 1, wherein each of the plurality of pixels has a pixel electrode which reflects a light at the light reflection portion, and
   the pixel electrode which reflects the light has an opening at the light transmission portion.

4. A liquid crystal display device according to claim 3, wherein the first substrate includes the pixel electrode, and the second substrate includes the color filter.

* * * * *